(12) United States Patent  (10) Patent No.: US 8,335,813 B2
Sun et al.  (45) Date of Patent: Dec. 18, 2012

(54) SYSTEMS, METHODS, AND PROTOCOLS FOR PROCESS MIGRATION AND GROUP MEMBERSHIP MANAGEMENT

(75) Inventors: Xian-He Sun, Darien, IL (US); Cong Du, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 634 days.

(21) Appl. No.: 12/045,546

(22) Filed: Mar. 10, 2008

(65) Prior Publication Data

US 2008/0273457 A1  Nov. 6, 2008

Related U.S. Application Data

(60) Provisional application No. 60/915,324, filed on May 1, 2007.

(51) Int. Cl.
*G06F 15/16* (2006.01)
(52) U.S. Cl. .................................................. 709/201
(58) Field of Classification Search .............. 709/201, 709/202, 203
See application file for complete search history.

(56) References Cited

U.S. PATENT DOCUMENTS

| | | | | |
|---|---|---|---|---|
| 5,524,253 A * | 6/1996 | Pham et al. | | 709/202 |
| 5,978,855 A | 11/1999 | Metz et al. | | |
| 6,529,948 B1 | 3/2003 | Bowman-Amuah | | |
| 6,842,769 B1 * | 1/2005 | Kim et al. | | 709/203 |
| 6,892,210 B1 | 5/2005 | Erickson et al. | | |
| 6,920,480 B2 | 7/2005 | Mitchell et al. | | |
| 7,743,126 B2 * | 6/2010 | Russell | | 709/223 |
| 2005/0256907 A1 | 11/2005 | Novik et al. | | |

FOREIGN PATENT DOCUMENTS

| | | |
|---|---|---|
| EP | 0251584 | 1/1988 |
| EP | 0421622 | 4/1991 |
| JP | 06067871 | 3/1994 |
| JP | 10021060 | 1/1998 |
| JP | 11003212 | 1/1999 |
| JP | 2001209413 | 8/2001 |
| WO | WO 9821863 | 5/1998 |
| WO | WO 0116728 | 3/2001 |
| WO | WO 2006002750 | 1/2006 |

OTHER PUBLICATIONS

C. Du, X.-H. Sun and K. Chanchio, "HPCM: A pre-compiler aided middleware for the mobility of legacy code," in Proc. IEEE Cluster Computing Conference, Hong Kong, Dec. 2003.
Cong Du and Xian-He Sun, MPI-Mitten: Enabling Migratiion Technology in MPI, in the Proc. of 6th IEEE International Symposium on Cluster Computing and the Grid, Singapore, May 2006.
K. Chancio, X.-H. Sun, "Communication state transfer for the mobility of concurrent heterogeneous computing," IEEE Trans. on Computers, vol. 53, No. 10, pp. 1260-1273, 2004.

* cited by examiner

*Primary Examiner* — Adnan Mirza
(74) *Attorney, Agent, or Firm* — K&L Gates LLP

(57) ABSTRACT

A system, method, and set of protocols for dynamic group communication are provided for enabling dynamic process migration and dynamic group membership management. A process in a group receives and distributes a migration signal. Group communication continues while the processes in the group asynchronously reach a global superstep and then a synchronization point. The processes then spawn a new process on a new device and update group membership information. The new process operates in continuous execution with the new group.

22 Claims, 12 Drawing Sheets

Figure 5

500
DISTRIBUTED MIGRATION
PROTOCOL

---

$C = \{<P_0, P_1,...P_{n-1}>\}$: Initiation
Initiation()
Begin
Asynchronously waiting for migration notification;
End

---

$P_j$: On migration signal to migrate to machine *m*
OnMigration()
Begin
  Send a migration notification ($MIG\_CMD$ $P_j$) to each process $P_i$ in application *App*
  = $\{P_0, P_1,...P_{n-1}\}$
  CollectiveSyn();
End

---

$P_i$: where $P_i \in \{P_0, P_1,...P_n\}$; $C = \{<P_0, P_1,...P_{n-1}>\}$: Reaching a synchronization point
$P_n$: After Initiated;  $P_j$: In migration
CommUpdate()
Begin:
  If *( i < n )* then
    Collectively spawn a new process $P_n$;
  Else if *( i == n )* then
    Process initiation
  End if
  Collectively establish a new group $C_{new} = \{<P_0, P_1, P_{j-1}, P_n, P_{j+1}...P_{n-1}>\}$;
  Replace $C$ with $C_{new}$;
  If *( i == j )* then
    Local process state collection;
    Send communication state to $P_n$;
    Send local process state to $P_n$;
    Process finalization
  Else if *( i == n )* then
    Receive communication state from $P_j$;
    Receive local process state from $P_j$;
    Process state restoration;
    Reset migration and synchronization flags;
  Else
    If $P_i$ is awakened
      Repeat pending pt2pt operation *op*;
    Endif
    Reset migration and synchronization flags;
  End if
End

700
COLLECTIVE
SYNCHRONIZATION
PROTOCOL

$P_j$: After distributing the migration cmd;
CollectiveSyn()
Begin
  Lock *super_step* for read;
  *step = 0;*
  For i = 0 to n-1 do
    If ( *super_step$_i$ > step*) then
      *step = super_step$_i$;*
    End if
  End for
  For i = 0 to n-1 do
    If ( i <> j ) then
      Send *step* to $P_j$
    End if
  End for
  Unlock *super_step*
End

---

$P_i$: Before entering a collective communication; where $P_i \in \{P_0, P_1, ... P_{j-1}, P_{j+1} ... P_{n-1}\}$;
BeforeCollective()
Begin
  Test migration *cmd*;
  If ( *cmd == MIG_CMD $P_j$* ) then
    Recv *migration cmd*;
    Recv *global_superstep* from $P_j$;
  End if
  If ( *superstep == global_superstep* ) then
    P2Psyn();
  End if
  Increase *superstep*;
End

---

$P_i$: After a communication operation; where $P_i \in \{P_0, P_1, ...P_{n-1}\}$;
AfterOp()
Begin
  If ($P_i$ is in synchronization phase and
  *superstep == global_superstep*) then
    P2Psyn();
  End if
End

900
POINT-TO-POINT
SYNCHRONIZATION
PROTOCOL

Figure 9

$P_i$: reaching the global super step where $P_i \in \{P_0, P_1, \ldots P_{n-1}\}$;
P2PSyn()
Begin
  If *(i == j)* then
    Lock *current_op* for read;
    For k = 0 to n-1 do
      If $P_k$ is block waiting for $P_x$, then
        If *(x == j)* then
          wake $P_k$;
        Else
          send *MIG_WAKE* $P_k$ to $P_x$;
        End if
      End if
      For k = 0 to n-1 do
        If *(k <> j)* then
          send *MIG_END* to $P_k$;
        End if
      End for
    End for
    Unlock *current_op*;
  Else
    Receive cmd from $P_j$;
    While ( *cmd == MIG_WAKE* $P_k$ ) Do
      wake $P_k$;
    End while
    Assert (*cmd == MIG_END*);
  Endif
  If $P_i$ is awakened,
    Mark the previous pt2pt operation *op* as pending;
  Endif
  Drain local communication channel and save the data as local communication state;
  CommUpdate()
End

1100
MPI-MITTEN
OVERHEAD

SYSTEMS, METHODS, AND PROTOCOLS FOR PROCESS MIGRATION AND GROUP MEMBERSHIP MANAGEMENT

RELATED APPLICATIONS

This application claims the benefit of U.S. Provisional Patent Application No. 60/915,324, filed May 1, 2007 entitled "Systems, Methods, and Protocols for Process Migration and Group Membership Management", the contents of which are hereby incorporated by reference.

TECHNICAL FIELD

The present application relates in general to process migration and group membership management and more specifically to dynamic group communication with dynamic process migration and dynamic group membership management.

BACKGROUND

Recent advances in computing technologies have allowed an increasing number of computing devices to communicate, work collectively, and manage processes via a network in order to provide services that may otherwise not be available. However, in this coordinated environment, the service provided by a group of processes located on different devices and working together can fail due to a single point of failure. The failure rate increases as the number of computing devices hosting processes increases, making it increasingly more important to provide a means for fault tolerance and continued group communication.

Fault tolerance can be supported by migrating a process from a failing device to a stable device, in order to provide continued service. In addition to migrating the process, the group membership information must be updated to account for the migrated process. Typically, migrating a process requires finishing all pending communications and stopping all group communication while the migration occurs. The amount of time a migration takes depends on various factors. The interruption in group communication may cause problems for a user such as service interruptions. The cost of an interruption caused by migration may be high, particularly in a distributed mobile environment.

Modern computing devices are likely to be mobile devices, which communicate and receive service through local service stations. When a mobile device moves, its local service station may change. Changing the service station requires process migration and updating the group membership information. Current mobile computing is limited when the computing involves communication among multiple processes on multiple computers, where the processes are involved in group communication, due to the interruption in group communication associated with a process migration.

Mobility is an integral part of modern information services. For instance, when a user participates in a conversation using a mobile phone on a train, the user will probably pass several mobile service stations, which will provide the mobile phone with a communication signal. Typically, the transfer of the communication signal from each service station to the next should be transparent to the user. Computing works similarly in that a piece of software can be downloaded automatically when needed, or can move from one computing device or service station to another in order to provide continued service. Another example of group communication requiring the mobility of a computing device is when multiple users participate in an online game concurrently and interactively through multiple computers. If one of the users moves from one service station to another service station, all communications with that particular user may be lost. The user will not be able to continue to participate in the game without a service interruption unless all processes from the first service station are transparently migrated to the second service station and the group membership information is updated.

SUMMARY

The systems, methods, and protocols disclosed herein provide an improvement to providing increased fault tolerance and transparent service to a user with dynamic group communication. Migrating a process without halting group communication requires dynamic group communication. Dynamic group communication is a form of group communication that allows for dynamically synchronizing all processes in a group, dynamically migrating a process located on a failing device, and dynamically updating the group membership information, in order to provide uninterrupted group communication and transparent service.

Group communications are commonly used in networked computing where multiple users and/or processes need to coordinate and work collectively, however, existing migration mechanisms do not support dynamic group communications. Typically, group communication mechanisms stop all communication prior to the migration of the process and then restart communication after the migration is completed. Stopping communication may not allow for transparent process migration, so conventional approaches struggle to keep up with the pace of many commercial applications, such as computer gaming. Dynamic group communication can instead be used to support continued service by moving processes, software, etc. from a failing device to a working device without halting group communications. Dynamic group communication allows processes to operate asynchronously while preparing for the process migration so group communications continue during the migration. In this fashion, there is not a large backup of communications following a migration, and the migration is transparent to the user.

BRIEF DESCRIPTION OF THE FIGURES

FIG. 5 is an outline of a source code implementation of an example distributed migration protocol.

FIG. 7 is an outline of a source code implementation of an example collective synchronization protocol.

FIG. 9 is an outline of a source code implementation of an example point-to-point synchronization protocol.

DETAILED DESCRIPTION

The present disclosure introduces example systems, methods, and protocols to handle dynamic group communication of processes. Protocols are preferably implemented as a thin-layered modular software component designed to run on top of non-migration-supported communication protocols.

Figure 1:
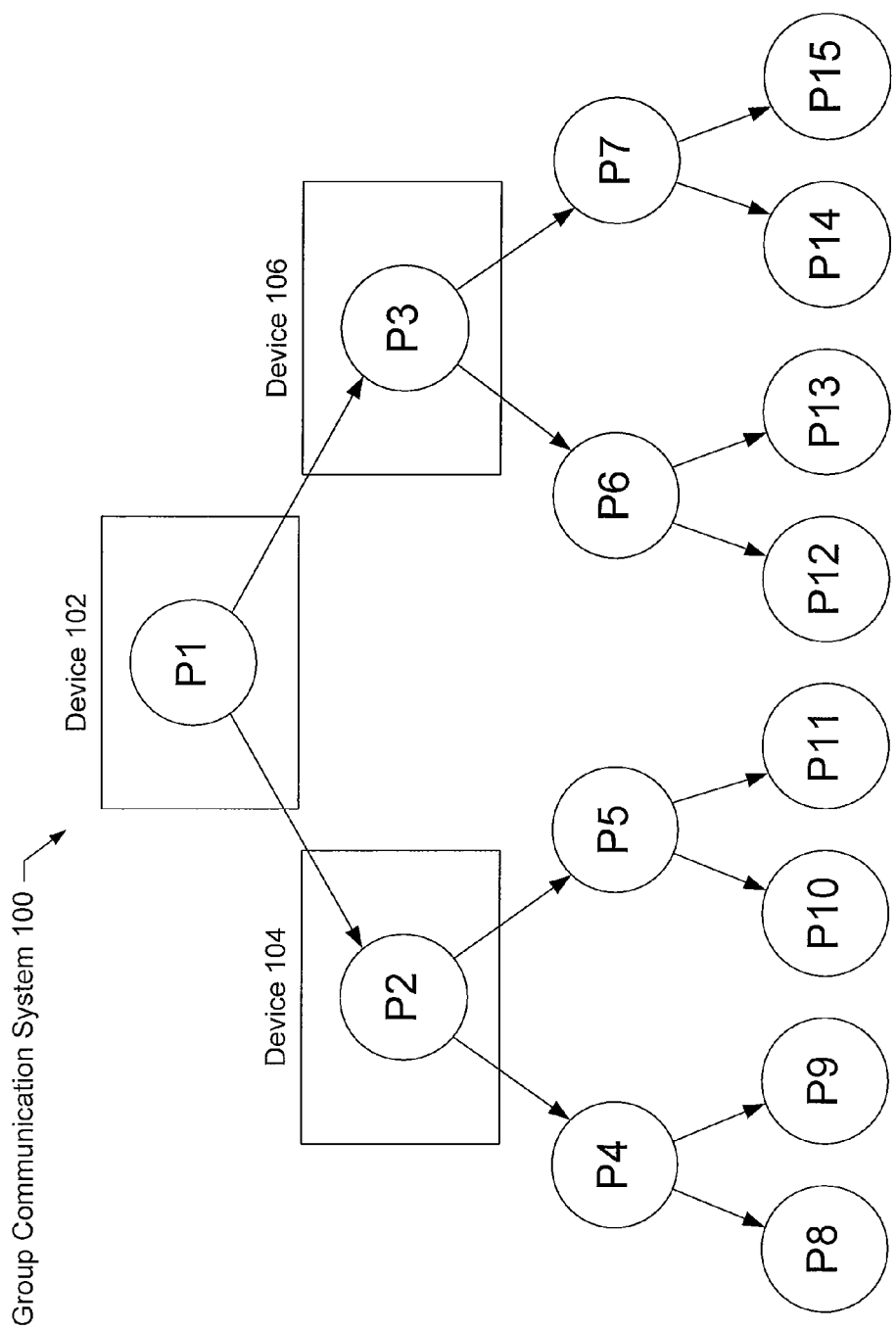
FIG. 1 is a block diagram of an example group communication system.

FIG. 1 is a block diagram of an example group communication system 100. The processes P1 through P15 may be located on various remote devices. For example, P1 may be located on device 102, P2 may be located on device 104, P3 may be located on device 106, etc. One or more processes may reside on one or more devices, and two or more processes may form a group such that the processes may communicate through a message passing interface and perform various operations. For example, process P1 communicates messages via group communication to each other process in the group (P2 through P15). In this example, P1 sends a message to P2 and P3, then P2 and P3 each send the message to two more processes, and so on until each process receiving a message receives the message. It should be appreciated that many methods and protocols may be used for group communication and many group membership management goals may be achieved through various methods and protocols. For example, the processes that receive a message and the order of sending messages may be altered depending on the various system factors such as efficiency, fault tolerance, system capabilities, communication infrastructure, etc.

Figure 2:
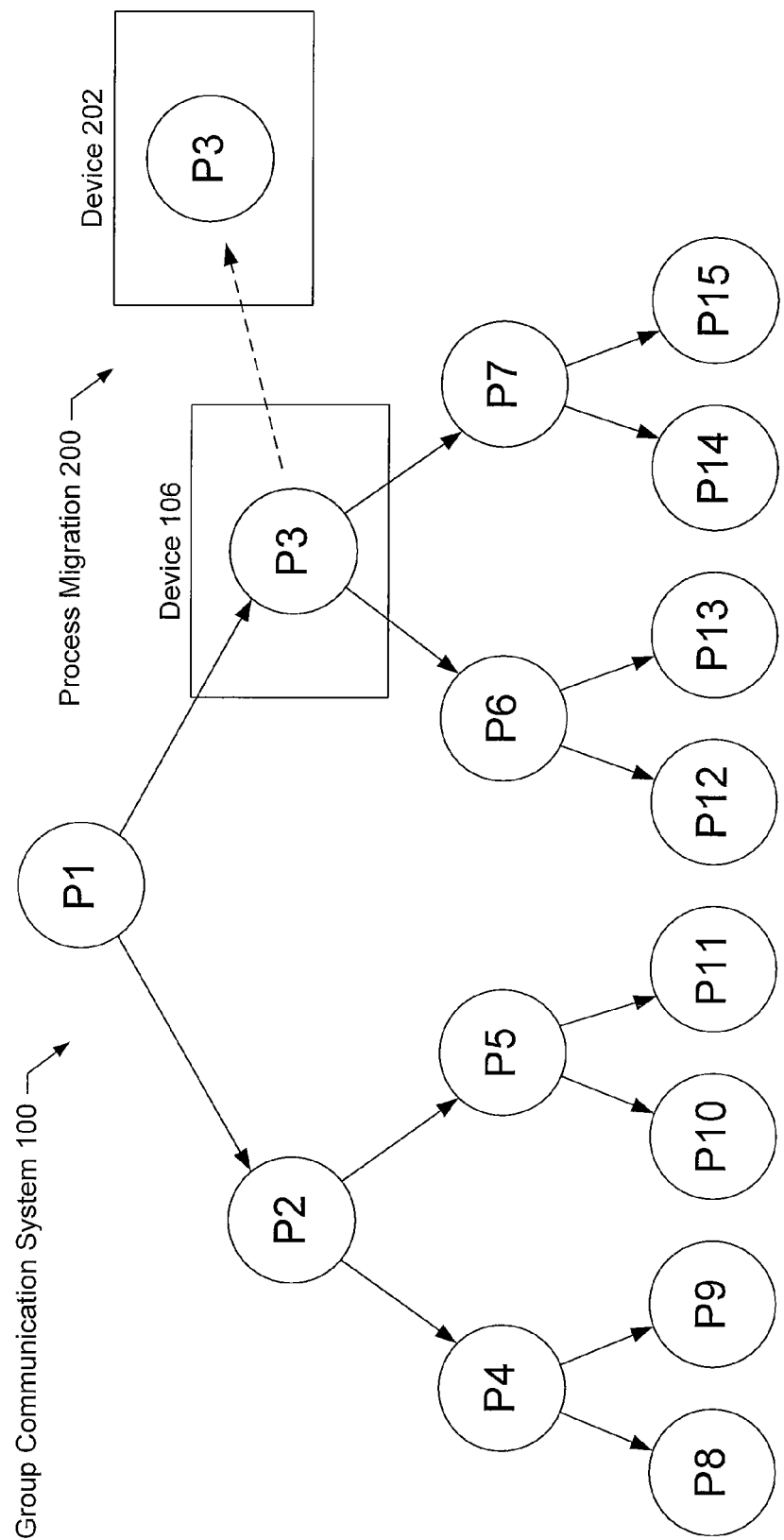
FIG. 2 is a block diagram of an example group communication system with a process migration.

FIG. 2 is a block diagram of an example group communication system 100 with a process migration 200. Process P1 communicates messages via group communication to each other process in the group (processes P2 through P15) and process P3 migrates from device 106 to device 202. In order for group communication to continue without interruption, when process P3 migrates to the new device 202, the group membership information is updated so process P3 may continue to receive and send messages. Group membership information is information relating to the processes that are members of the group. In an embodiment, the group membership information includes information about the processes that form a group, such as the communication state, local process states, process identifiers, device IP addresses, communication dependency information, etc. Group membership management is the management of the group, including managing which processes are group members, synchronization procedures, what each process does with the group, the updating of the group membership information, etc. Group membership management allows group communication to continue. When group membership information is updated, the group membership management may provide different communication algorithms, process ranks, etc. in light of the updated group membership information and the group membership management goals. It should be appreciated that if process P3 cannot send or receive messages, group communication may be interrupted and cause communication failures resulting in delays and/or failures of one or more processes. Typically, while process P3 migrates, the rest of the processes stop communicating, so for example, processes P1 and P2 may not communicate during a process migration 200. Once process P3 has migrated, the group membership information is updated, then the group continues communications. Dynamic group communication allows the processes in the group to continue communicating while process P3 migrates and while the group information is updated. For example, with dynamic group communication, while process P3 migrates, processes P1 and P2 may communicate, processes P2 and P4 may communicate, processes P4 and P8 may communicate, etc. Using dynamic group communication, a large backup of communications typically caused by a process migration 200 may be avoided because all communications do not stop during the process migration 200. Dynamic group communication thus allows for more efficient and transparent process migration 200.

Figure 3:
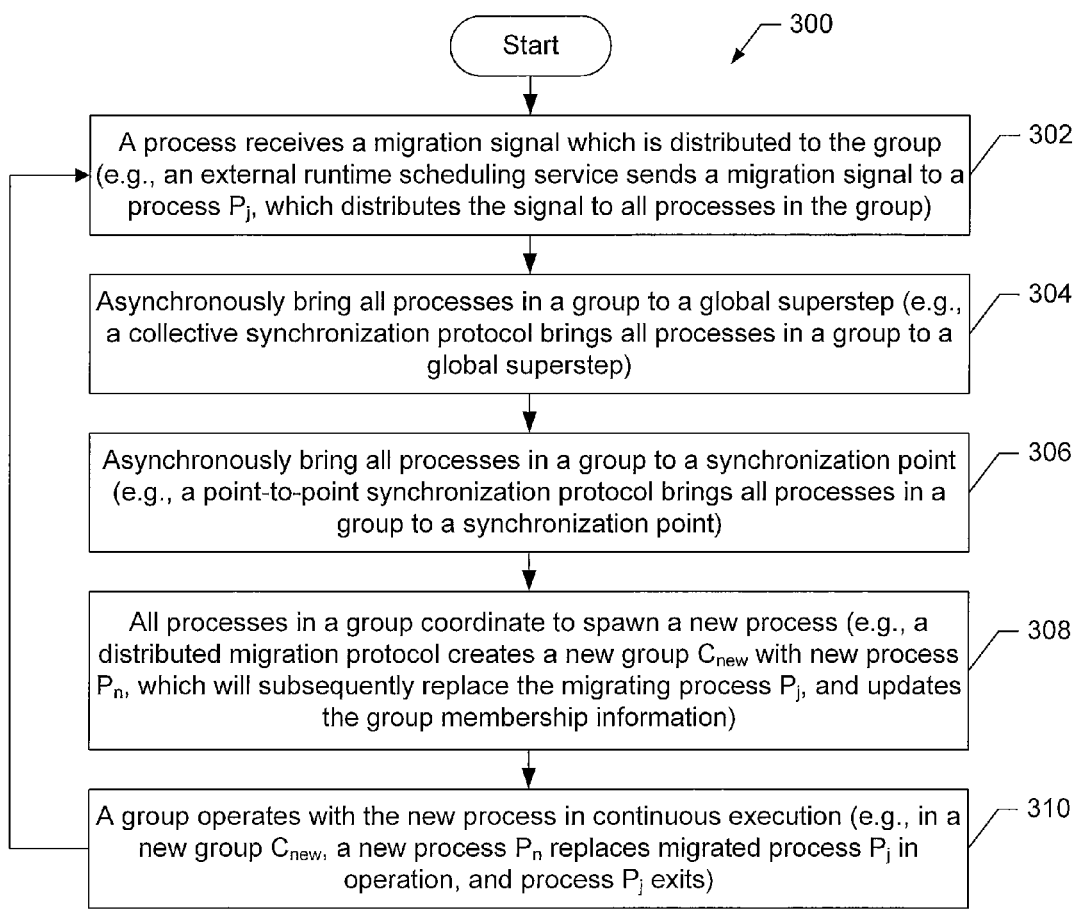
FIG. 3 is a flowchart of an example dynamic group communication protocol.

FIG. 3 is a flowchart of an example dynamic group communication protocol 300. Although the protocol 300 is described with reference to the flowchart illustrated in FIG. 3, it will be appreciated that many other methods of performing the acts associated with protocol 300 may be used. For example, the order of many of the blocks may be changed, and many of the blocks described are optional.

Figure 4:
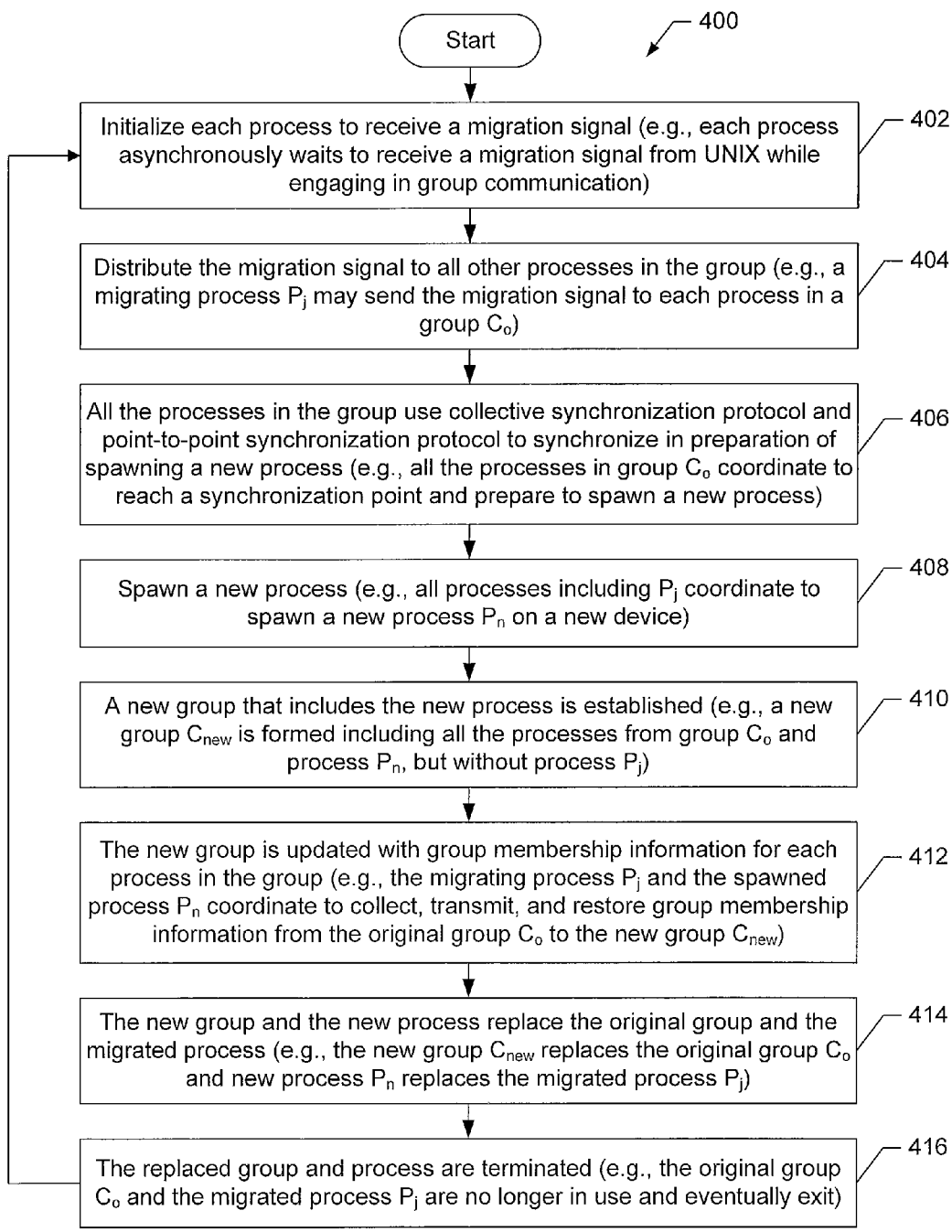
FIG. 4 is a flowchart of an example distributed migration protocol.
Figure 6:
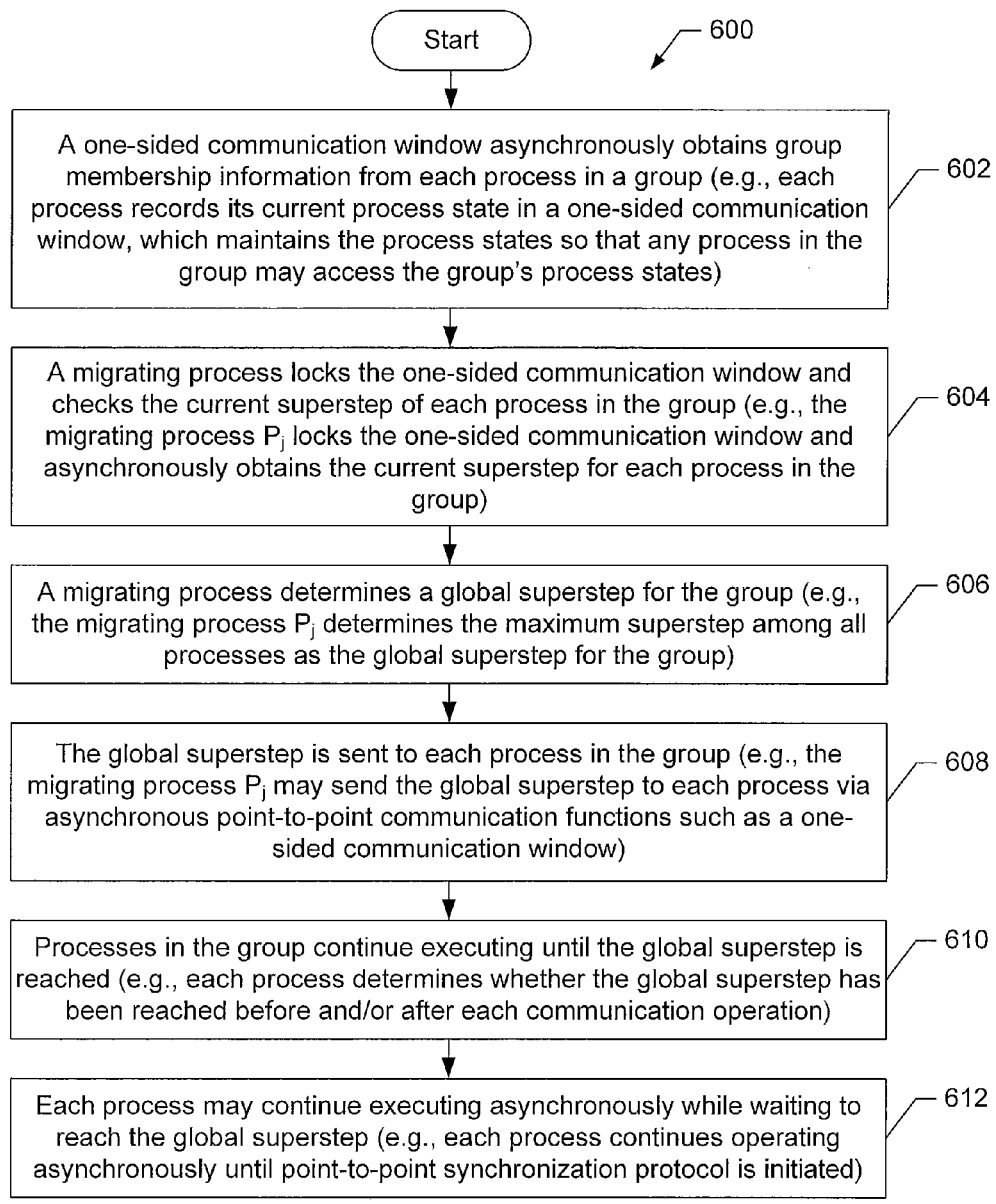
FIG. 6 is a flowchart of an example collective synchronization protocol.
Figure 8:
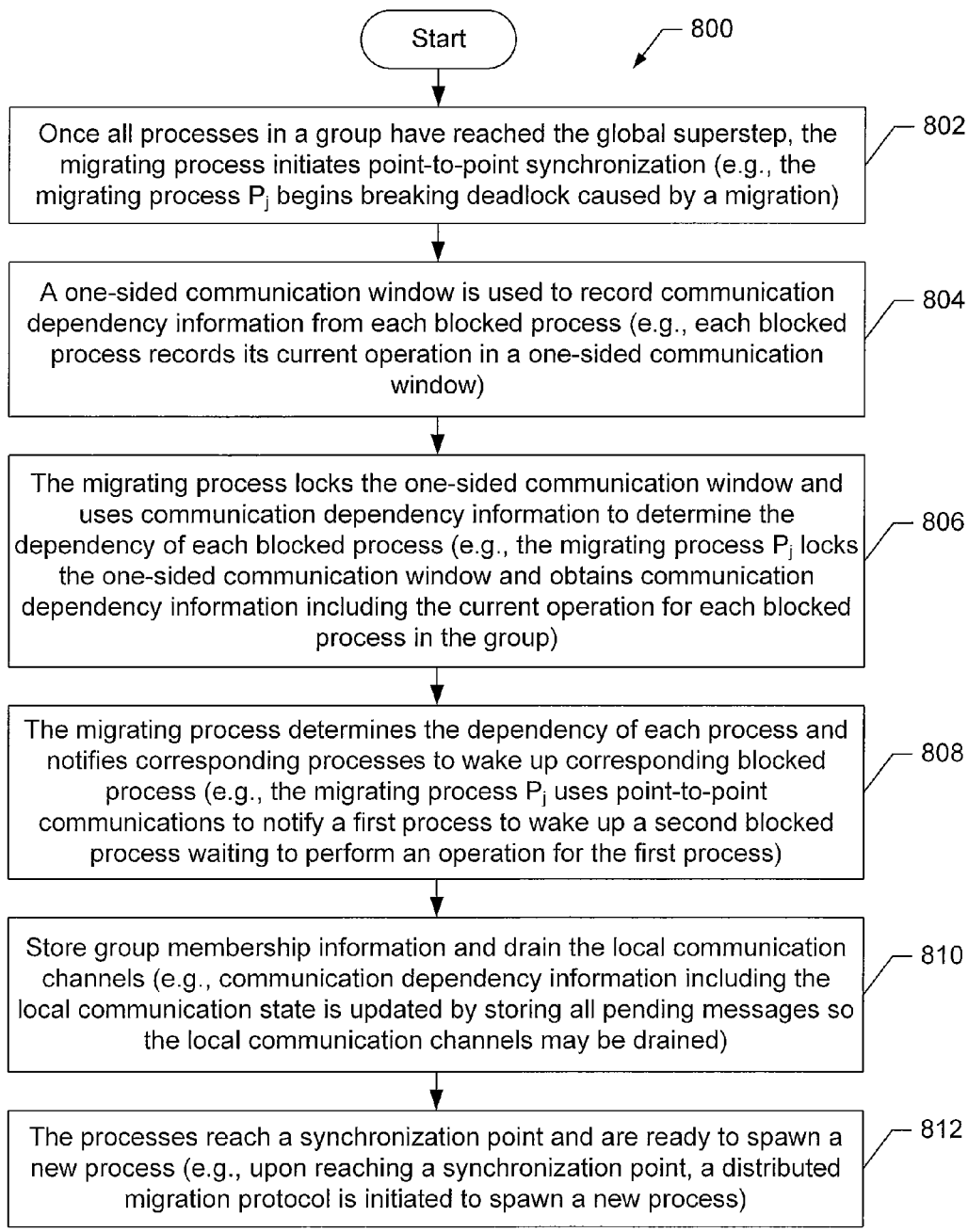
FIG. 8 is a flowchart of an example point-to-point synchronization protocol.

The example dynamic group communication protocol 300 is comprised of three sub-protocols, a distributed migration protocol, a collective synchronization protocol, and a point-to-point synchronization protocol. In the example dynamic group communication protocol 300, a distributed migration protocol causes a process to receive a migration signal, which is distributed to the group (block 302). For example, each process in a group is waiting to receive a migration signal and an external runtime scheduling system sends a migration signal to a process $P_j$. Preferably, the process $P_j$ then sends the migration signal to each other process in the group and each process agrees to the migration. Example embodiments of the distributed migration protocol are depicted in FIGS. 4 and 5 and described below. Next a collective synchronization protocol asynchronously brings all processes in a group to a global superstep (block 304). Example embodiments of the collective synchronization protocol are depicted in FIGS. 6 and 7 and described below. Once all the processes in the group are at the global superstep, a point-to-point synchronization protocol asynchronously brings all processes in the group to a synchronization point (block 306). Example embodiments of a point-to-point synchronization protocol is depicted in FIGS. 8 and 9 and described below. A distributed migration protocol causes all the processes to coordinate to spawn a new process (block 308). For example, a distributed migration protocol creates a new group $C_{new}$ with new process $P_n$, which will subsequently replace the migrating process $P_j$, and updates the group membership information. Once the group membership information is updated, the group operates with the new process in continuous execution (block 310). For example, in the new group $C_{new}$, the new process $P_n$ replaces the migrated process $P_j$ in operation, and process $P_j$ exits. The group may perform another dynamic process migration 200 upon receiving another migration signal.

FIG. 4 is a flowchart of an example distributed migration protocol 400. Although the protocol 400 is described with reference to the flowchart illustrated in FIG. 4, it will be appreciated that many other methods of performing the acts associated with protocol 400 may be used. For example, the order of many of the blocks may be changed, and many of the blocks described are optional. In this example, the original group $C_o$ contains a number of processes on various devices, the processes including process $P_j$. The group $C_o$ can communicate within the group and with other groups using point-to-point operations and collective operations.

In the example distributed migration protocol 400, each process is initialized to asynchronously receive a migration signal (block 402). For example, while participating in group communication, each process asynchronously waits to receive a migration signal from UNIX indicating that the process should migrate to a new device. Each process may asynchronously receive the migration signal in a variety of ways, such as from a UNIX signal, a monitoring daemon, a shared file system, or another process in the group. Once a migrating process receives a migration signal, it distributes the migration signal to all other processes in the group (block 404). For example, a migrating process $P_j$ may send the migration signal to each process in the group $C_o$. It should be appreciated that processes do not need to be synchronized to send or receive a migration signal. Preferably, processes only synchronize when a process is preparing to migrate. All the processes in the group use collective synchronization protocol and point-to-point synchronization protocol to synchronize in preparation of spawning a new process (block 406). For example, all the processes in group $C_o$ coordinate to reach a synchronization point and prepare to spawn a new process. A collective synchronization protocol and a point-to-point synchronization protocol will be described in more detail below. Once the group is synchronized, a new process is spawned (block 408). For example, all processes including $P_j$ coordinate to spawn a new process $P_n$ on a new device. Once a new process is spawned, a new group that includes the new process is established (block 410). For example, a new group $C_{new}$ is formed including all the processes from group $C_o$ and process $P_n$, but without process $P_j$. A new group may be formed using the MPI_Comm_Spawn function. The new group is updated with group membership information for each process in the group (block 412). For example, the migrating process $P_j$ and the spawned process $P_n$ coordinate to collect, transmit, and restore group membership information from the original group $C_o$ to the new group $C_{new}$. Typically, a new group is updated with the group membership information for each process in the group. The group membership information is used for group membership management, such as regulating the processes' status, communications, operations, etc., both within the group and outside of the group. The new group and the new process replace the original group and the migrated process (block 414). For example, the new group $C_{new}$ replaces the original group $C_o$ and new process $P_n$ replaces the migrated process $P_j$. It should be appreciated that the new group may consist of the same exact processes with the exception of the migrated process, which has changed devices, however, in operation, the new group $C_{new}$ and new process $P_n$ collectively replace the original group $C_o$ and migrated process $P_j$. The replaced group and process are terminated (block 416). For example, the original group $C_o$ and the migrated process $P_j$ are no longer in use and eventually exit.

FIG. 5 is an outline of a source code implementation of an example distributed migration protocol 500. Although the protocol 500 is described with reference to the outline illustrated in FIG. 5, it will be appreciated that many other methods of performing the acts associated with protocol 500 may be used. For example, the order of the source code may be changed, and portions of the source code described are optional.

The example distributed migration protocol 500 may be used for updating group membership information and group membership management. In the example distributed migration protocol 500, each process in group C is initialized to asynchronously receive a migration signal. Once process $P_j$ receives a migration signal, process $P_j$ sends a migration notification (MIG_CMD $P_j$) to each other process in group C. Once a synchronization point is reached, the processes reach a consensus to spawn a new process. Then, the processes collectively spawn a new process $P_n$. The new process $P_n$ is initialized. Then the processes collectively establish a new group $C_{new}$. The new group $C_{new}$ includes the newly spawned process $P_n$. It should be appreciated that establishing a process or new group may consist of one or more operations. For example, establishing a new group may be accomplished by first establishing an intercommunicator from the group C, and then establishing an intracommunicator as the new group $C_{new}$. Further, it should be noted that a process may be in more than one group and/or communicator at once. Once the new group $C_{new}$ is established, $C_{new}$ will replace the old group C. The migrated process $P_j$ collects group membership information, coordinates with the new process $P_n$, and sends the group membership information to process $P_n$ to restore and/or update the group membership information at group $C_{new}$. The new process $P_n$ replaces $P_j$ in operation and $P_j$ will exit at some point. Any point-to-point operations pending for an awakened process $P_i$ in the group $C_{new}$ may be repeated. It should be appreciated that following a migration, each process may use the updated group membership information, for example to determine the communication state before receiving a message from their communication channel and to finalize communication channels. All processes in group $C_{new}$ may reset migration flags and synchronization flags. Group $C_{new}$ continues operating with process $P_j$ in its new location.

FIGS. 6, 7, 8, and 9 are representations of example embodiments of synchronization protocols. The example synchronization protocols allow the processes in the group, which may be running independently and asynchronously, to reach a synchronization point in order to migrate a process involved in group communication. In an embodiment, synchronization is performed in two phases using a collective synchronization protocol and a point-to-point synchronization protocol. Synchronization protocol causes all processes in a group coordinate to reach the same superstep. Point-to-point synchronization causes all processes coordinating to reach a synchronization point within the superstep. In an embodiment, a superstep may be defined by the execution block between any two collective operations. An execution block is a sequence of operations performed by a process. Within a superstep, processes may send messages only through point-to-point communication channels.

FIG. 6 is a flowchart of an example collective synchronization protocol 600. Although the protocol 600 is described with reference to the flowchart illustrated in FIG. 6, it will be appreciated that many other methods of performing the acts associated with protocol 600 may be used. For example, the order of many of the blocks may be changed, and many of the blocks described are optional.

In the example collective synchronization protocol 600, a one-sided communication window asynchronously obtains group membership information from each process in a group (block 602). For example, each process records its current process state in a one-sided communication window, which maintains the process states so that any process in the group may access the group's process states. Once a migration signal has been distributed to all of the processes, a migrating process locks the one-sided communication window and checks the current superstep of each process in the group (block 604). For example, the migrating process $P_j$ locks the one-sided communication window and asynchronously obtains the current superstep for each process in the group. Then, a migrating process determines a global superstep for the group (block 606). For example, the migrating process $P_j$ determines the maximum superstep among all processes as the global superstep for the group. The global superstep is sent to each process in the group (block 608). For example, the migrating process $P_j$ may send the global superstep to each process via asynchronous point-to-point communication functions such as a one-sided communication window. Processes in the group continue executing until the global superstep is reached (block 610). For example, each process determines whether the global superstep has been reached before and/or after each communication operation. Each process may continue executing asynchronously while waiting to reach the global superstep (block 612). For example, each process continues operating asynchronously until point-to-point synchronization protocol is initiated.

FIG. 7 is an outline of a source code implementation of an example collective synchronization protocol 700. Although the protocol 700 is described with reference to the outline illustrated in FIG. 7, it will be appreciated that many other methods of performing the acts associated with protocol 700 may be used. For example, the order of the source code may be changed, and portions of the source code described are optional. It should be appreciated that the protocol 700 is merely one example outline of source code that may embody the example collective synchronization protocol 600 described above.

FIG. 8 is a flowchart of an example point-to-point synchronization protocol 800. Although the protocol 800 is described with reference to the flowchart illustrated in FIG. 8, it will be appreciated that many other methods of performing the acts associated with protocol 800 may be used. For example, the order of many of the blocks may be changed, and many of the blocks described are optional.

In the example point-to-point synchronization protocol 800, once all processes in a group have reached the global superstep, the migrating process initiates point-to-point synchronization (block 802). For example, the migrating process $P_j$ begins breaking deadlock caused by a migration. It should be appreciated that communications may be blocked for a process that has pending communications which were not performed because the process was waiting for the global superstep and/or waiting to receive a communication from another process that is directly or indirectly blocked by the migration. The migrating process $P_j$ may determine the dependency of each process on the other processes in the group. A one-sided communication window is used to record group membership information from each blocked process (block 804). For example, each blocked process records its current operation in a one-sided communication window. The migrating process locks the one-sided communication window and uses group membership information to determine the dependency of each blocked process (block 806). For example, the migrating process $P_j$ locks the one-sided communication window and obtains communication dependency information including the current operation for each blocked process in the group. The migrating process determines the dependency of each process and notifies corresponding processes to wake up corresponding blocked process (block 808). For example, the migrating process $P_j$ uses point-to-point communications to notify a first process to wake up a second blocked process waiting to perform an operation for the first process. For example, the migrating process $P_j$ may wake up a blocked process $P_k$ with a command such as MIG_WAKE $P_k$. Once all processes are awake, store group membership information and drain the local communication channels (block 810). For example, communication dependency information including the local communication state is updated by storing all pending messages so the local communication channels may be drained. The communication channels are typically defined as the pathways for communication utilized by the underlying platform and are bidirectional, First-In, First-Out (FIFO). A command such as MIG_END may signal that all processes are awake, and cause the group membership information to be stored and communication channels drained. Once the pending messages are stored, the processes have reached a synchronization point and are ready to spawn a new process (block 812). For example, upon reaching a synchronization point, a distributed migration protocol 400 is initiated to spawn a new process.

FIG. 9 is an outline of a source code implementation of an example point-to-point synchronization protocol 900. Although the protocol 900 is described with reference to the outline illustrated in FIG. 9, it will be appreciated that many other methods of performing the acts associated with protocol 900 may be used. For example, the order of the source code may be changed, and portions of the source code described are optional. It should be appreciated that the protocol 900 is merely one example outline of source code that may embody the example point-to-point synchronization protocol 800 described above.

It should be appreciated that many of the processes performed by the example protocols may be overlapping and/or performed by a different protocol than the example protocols describe. For example, a distributed migration protocol 400 and/or a point-to-point synchronization protocol 800 may overlap when pending operations are repeated in a new group after waking up a blocked process.

Figure 10:
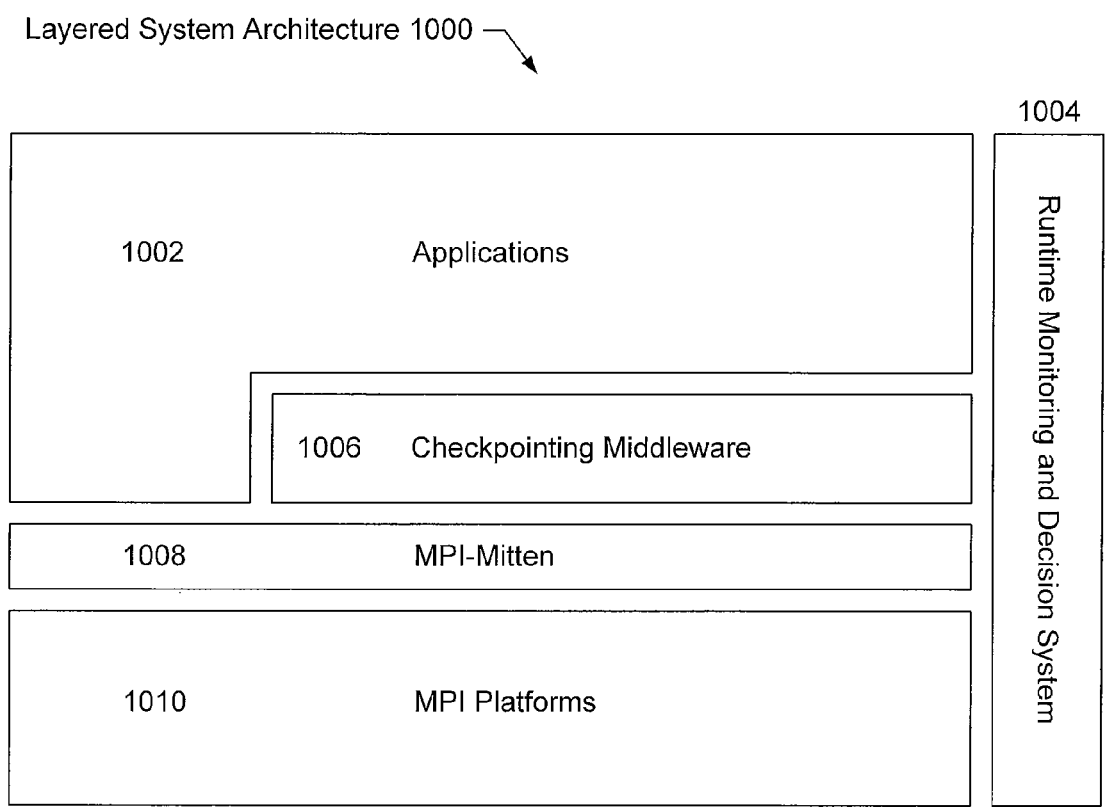
FIG. 10 is a block diagram of an example layered system architecture.

FIG. 10 is a block diagram of an example layered system architecture 1000. System 1000 is typically compatible with existing parallel programming environments. System 1000 preferably employs Message Passing Interface (MPI) primitives to create communication protocols that may synchronize processes, manage and update groups, and maintain a consistent global communication state during a process migration. MPI Primitives are basic operations supported by MPI standards. Example layered system architecture 1000 includes MPI-Mitten 1008, a thin, high-level, add-on layer positioned between application layer 1002 and MPI Platform layer 1010.

MPI-Mitten 1008 may be implemented as a portable communication library that enhances an application with dynamic group membership management that manages processes to increase fault tolerance. MPI standards define many collective primitives and may allow primitives to be optimized for various hardware platforms to achieve better performance. Dynamic group membership management functions, such as process spawning, merging, and splitting, and one-sided communication functions, such as put and get, are supported by underlying MPI platforms. Examples of underlying platforms include Local Area Multicomputer MPI (LAM/MPI) and MPI Chameleon 2 (MPICH2), although any suitable platform may be used, for example, platforms that support the functions defined in standards such as MPI and MPI-2.

An embodiment of the present disclosure uses middleware 1006 such as HPCM (High Performance Computing Mobility) to preserve a local process execution state and maintain active disk Input/Output (I/O) channels. Typically, other process migration or checkpointing middleware 1006 can also be utilized so long as it preserves local process state at a kernel level or a user level. Middleware 1006 may be customized to different scenarios on heterogeneous and homogeneous platforms and may perform efficiently. External runtime system 1004 may monitor the status of processes and evaluate when and where to migrate a process when it detects an imminent failure. In an embodiment, external runtime system 1004 and middleware 1006 are not built-in components of system 1000.

Figure 11:
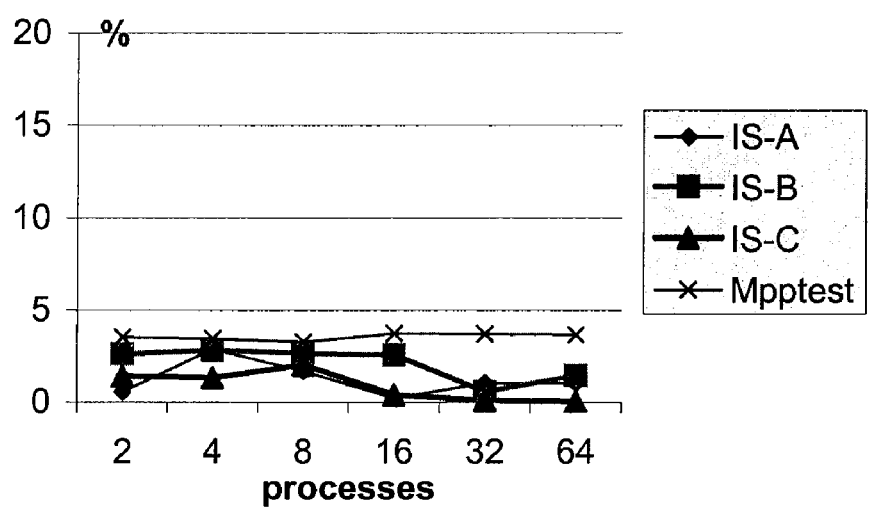
FIG. 11 is an example graphical illustration of MPI-Mitten overhead for the NAS IS benchmark and for the Mpptest benchmark.
Figure 12:
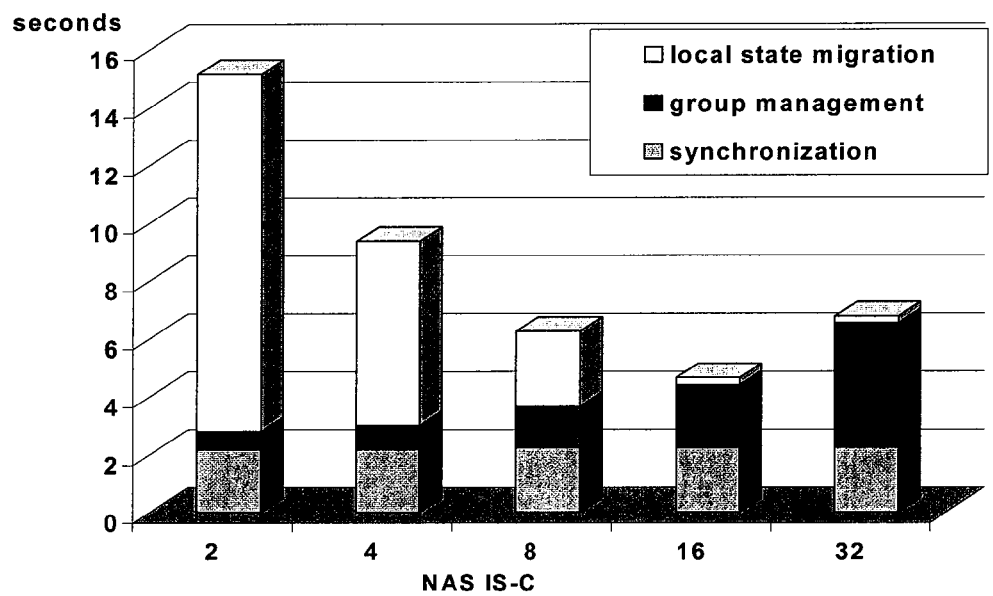
FIG. 12 is an example graphical illustration of the efficiency and scalability of dynamic process migration of an embodiment of the present disclosure for the NAS IS benchmark.
Figure 13:
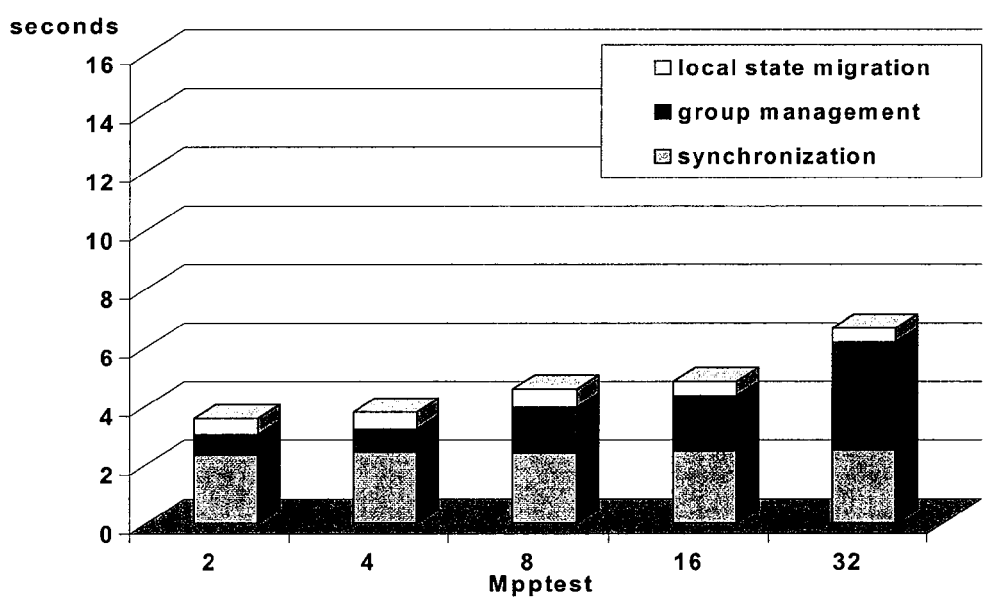
FIG. 13 is an example graphical illustration of the efficiency and scalability of dynamic migration of an embodiment of the present disclosure for the Mpptest benchmark.

Referring to FIGS. 11, 12, and 13, experimental results are shown. In order to verify the practical feasibility, effectiveness, and scalability of a distributed migration protocol 400, a collective synchronization protocol 600, and a point-to-point synchronization protocol 800, the MPI-Mitten library has been implemented and tested on the SunWulf Computer Farm in the Scalable Computing Software (SCS) laboratory at the Illinois Institute of Technology.

Two typical MPI benchmarks were selected for testing. The first was the IS benchmark from NAS Parallel Benchmark 3.1; the other was Mpptest. The NAS IS benchmark tests an integer sorting operation. It fills a vector with random integers, and then computes a rank for each number. The NAS IS benchmark features significant data communication, especially collective communication, and is used to test the effectiveness of the protocols as well as the normal execution overhead. Mpptest is a program that measures the performance of some MPI message passing routines in a variety of situations. It is a communication-intensive benchmark that tests the communication performance of distributed-memory parallel supercomputers (MPP's).

The system overhead was first tested during normal execution with no failures detected and therefore no migration taking place. FIG. 11 is an example graphical illustration of MPI-Mitten overhead for the NAS IS benchmark and for the Mpptest benchmark. Because the NAS IS and the Mpptest benchmarks contain many collective operations, the experiment results for these benchmarks represent an example of a worst case scenario. The tests were performed for data sizes from A to C where C was the maximum problem size. The tests were performed on 2 to 64 processes. The overall overhead was less than 4% and the average overhead was 1.22% for NAS IS and 3.55% for Mpptest. The overhead was caused by the "test" operations and synchronization operations before and after communication primitives. Because the migration signal is sent via asynchronous communication primitives, this operation does not introduce much overhead.

FIG. 12 is an example graphical illustration of the efficiency and scalability of dynamic process migration of an embodiment of the present disclosure for the NAS IS benchmark. Similarly, FIG. 13 is an example graphical illustration of the efficiency and scalability of dynamic migration of an embodiment of the present disclosure for the Mpptest benchmark. The NAS IS benchmark and Mpptest were run with 2 to 32 processes, and the example results show that the synchronization time is almost constant while the number of processes increases. The average synchronization time was 2.21 seconds for NAS IS and 2.42 for Mpptest. When the processes were increased to 32, the problem partition size decreased, so the total dynamic process migration cost also decreased. The dynamic group membership management time increased slowly because more time was spent on the initiation of a new process at the destination device. This experiment demonstrates that spawning a new process and new process initiation contribute 69.3% to 81.8% of the dynamic group membership management cost. Therefore, the dynamic group membership management cost depends on the implementation of the MPI platform. Optimizing the MPI process initialization may improve the dynamic group membership management performance.

The following publication, the entire content of which is incorporated herein by reference, includes further information regarding migration technology including MPI-Mitten: Cong Du, Xian-He Sun, "MPI-Mitten: Enabling Migration Technology in MPI," CCGRID, pp. 11-18, Sixth IEEE International Symposium on Cluster Computing and the Grid (CCGRID 06), May 16, 2006.

In summary, persons of ordinary skill in the art will readily appreciate that systems, methods and protocols for dynamic group communication have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention not be limited by this detailed description of examples.

The invention is claimed as follows:

1. A system for dynamic group communication, the system comprising:
   a network;
   a first computing device executing a first computing process;
   a second computing device executing a second computing process;
   a third computing device executing a third computing process;
   the first computing process, the second computing process, and the third computing process communicating via the network, wherein the first computing process, the second computing process, and the third computing process form a first group;
   the first computing process, the second computing process, and the third computing process communicating within the first group using a protocol, the protocol enabling the first computing process to migrate via the network from the first computing device to at least one of the second computing device and a fourth computing device by:
      obtaining group membership information for the first group of computing processes, the group membership information pertaining to at least the first computing process, the second computing process, and the third computing process in the first group, wherein the first computing process is located on the first computing device;
      waiting for a migration signal asynchronously at the first group;
      receiving the migration signal asynchronously at the first computing process;
      sending the migration signal asynchronously from the first computing process to at least one of the second computing process and the third computing process;
      establishing a synchronization point collectively within the first group;
      operating asynchronously until the first group reaches the synchronization point;
      ensuring that the first group reaches the synchronization point;
      spawning a fourth computing process by the first group on at least one of the second computing device and the fourth computing device, the fourth computing process replacing the first computing process in operation;
      establishing a second group of computing processes, the second group including the second computing process, the third computing process, and the fourth computing process, the second group replacing the first group in operation; and
      maintaining group membership information for the second group, the group membership information pertaining to at least the second computing process, the third computing process, and the fourth computing process; and the protocol enabling the first computing process, the second computing process, and the third computing process to asynchronously exchange data while the first computing process migrates.

2. The system of claim 1, wherein the protocol enables the first computing process and the second computing process to communicate using point-to-point communication while the first computing process migrates from the first computing device to the second computing device.

3. The system of claim 1, wherein the protocol enables the first computing process and the third computing process to communicate using point-to-point communication while the first computing process migrates from the first computing device to the second computing device.

4. The system of claim 1, wherein the protocol enables the first computing process and the second computing process to communicate using point-to-point communication while the first computing process migrates from the first computing device to the fourth computing device.

5. The system of claim 1, wherein the protocol enables the first computing process and the second computing process to communicate using collective communication while the first computing process migrates from the first computing device to the second computing device.

6. The system of claim 1, wherein the protocol enables the first computing process and the third computing process to communicate using collective communication while the first computing process migrates from the first computing device to the second computing device.

7. The system of claim 1, wherein the protocol enables the first computing process and the second computing process to communicate using collective communication while the first computing process migrates from the first computing device to the fourth computing device.

8. The system of claim 1, wherein at least one of the first computing device, the second computing device, and the computing third device stores information for the first computing process, the second computing process, and the third computing process, the information stored according to the protocol.

9. The system of claim 8, wherein the information is used to manage group membership according to the protocol.

10. The system of claim 1, wherein the first computing device, the second computing device, and the third computing device select the network from a homogeneous network and a heterogeneous network.

11. The system of claim 1, wherein the first computing process, the second computing process, and the third computing process to asynchronously exchange data while the first computing process, the second computing process, and the third computing process synchronize.

12. A method for dynamic process migration and dynamic group membership management, the method comprising:
   obtaining group membership information for a first group of computing processes, the group membership information pertaining to at least a first computing process, a second computing process, and a third computing process in the first group, wherein the first computing process is located on a first computing device;
   waiting for a migration signal asynchronously at the first group;
   receiving the migration signal asynchronously at the first computing process;
   sending the migration signal asynchronously from the first computing process to at least one of the second computing process and the third computing process;
   establishing a synchronization point collectively within the first group;
   operating asynchronously until the first group reaches the synchronization point;
   ensuring that the first group reaches the synchronization point;
   spawning a fourth computing process by the first group on a second computing device, the fourth computing process replacing the first computing process in operation;
   establishing a second group of computing processes, the second group including the second computing process, the third computing process, and the fourth computing process, the second group replacing the first group in operation; and
   maintaining group membership information for the second group, the group membership information pertaining to at least the second computing process, the third computing process, and the fourth computing process.

13. The method of claim 12, wherein obtaining group membership information for the first group includes creating a one-sided communication window for the first computing process to provide group membership information comprising the IP address of the first computing device.

14. The method of claim 12, wherein the first computing process receives the migration signal from an external runtime system.

15. The method of claim 12, wherein the first computing process receives the migration signal internally from the first computing process.

16. The method of claim 12, wherein establishing a synchronization point requires the second computing process and the third computing process to approve the process migration of the first computing process.

17. The method of claim 12, wherein the first computing process, the second computing process, and the third computing process operate asynchronously using point-to-point communication until the synchronization point is reached.

18. The method of claim 12, wherein the first computing process, the second computing process, and the third computing process operate asynchronously using collective communication until the synchronization point is reached.

19. The method of claim 12, wherein ensuring the first group reaches the synchronization point, comprises:
   determining a global superstep at the first computing process;
   transmitting the global superstep to at least one of the second computing process and the third computing process;
   waiting for the first group to asynchronously reach the global superstep;
   using point-to-point communication to ensure that the second computing process and the third computing process are awake after the first group reaches the global superstep.

20. The method of claim 12, wherein the first group collectively reaches a consensus to spawn the fourth process on the second device.

21. The method of claim 12, wherein group membership information comprises the local communication state.

22. A non-transitory computer readable medium storing instructions for implementing a protocol for dynamic process migration and dynamic group membership management comprising:
   a first set of instructions which enables a first computing process in a first group of computing processes to asynchronously receive a migration signal, wherein the first group is comprised of at least a first computing process, a second computing process, and a third computing process, wherein the first computing process is located on a first computing device;

a second set of instructions which causes the migration signal to be distributed to each computing process in the first group, wherein the first group is enabled to asynchronously exchange data while the second set of instructions is executed;

a third set of instructions which causes the group to collectively establish a global superstep, wherein the first group is enabled to asynchronously exchange data while the third set of instructions is executed;

a fourth set of instructions which causes each process in the first group to reach the global superstep, wherein the first group is enabled to asynchronously exchange data while the fourth set of instructions is executed;

a fifth set of instructions which ensures that each computing process in the first group reaches a synchronization point, wherein the first group is enabled to asynchronously exchange data while the fifth set of instructions is executed;

a sixth set of instructions which causes the first group to spawn a fourth computing process, wherein the fourth computing process is located on a second device;

a seventh set of instructions which causes the first group to create a second group of computing processes and maintain group membership information for the second group; and an eighth set of instructions which causes the fourth computing process to replace the first computing process, wherein the second group is enabled to asynchronously exchange data while the eighth set of instructions is executed.

* * * * *